(12) United States Patent
Inoue

(10) Patent No.: US 7,346,683 B2
(45) Date of Patent: Mar. 18, 2008

(54) ELECTRONIC SERVICE SYSTEM USING MAIN SITE SERVER AND PARTNER SITE SERVER

(75) Inventor: Atsushi Inoue, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 745 days.

(21) Appl. No.: 09/960,339

(22) Filed: Sep. 24, 2001

(65) Prior Publication Data

US 2002/0038367 A1    Mar. 28, 2002

(30) Foreign Application Priority Data

Sep. 28, 2000    (JP) .............. 2000-297444

(51) Int. Cl.
*G06F 15/173* (2006.01)
(52) U.S. Cl. .................................. 709/225
(58) Field of Classification Search ........ 709/204–227, 709/229, 246; 707/4; 717/113; 715/738–739
See application file for complete search history.

(56) References Cited

U.S. PATENT DOCUMENTS

| | | | | |
|---|---|---|---|---|
| 5,819,092 | A * | 10/1998 | Ferguson et al. ........... | 717/113 |
| 6,182,142 | B1 * | 1/2001 | Win et al. ................... | 709/229 |
| 6,490,624 | B1 * | 12/2002 | Sampson et al. ........... | 709/227 |
| 6,523,027 | B1 * | 2/2003 | Underwood ................... | 707/4 |
| 6,826,595 | B1 * | 11/2004 | Barbash et al. ............. | 709/204 |
| 6,829,654 | B1 * | 12/2004 | Jungck ........................ | 709/246 |
| 2003/0085918 | A1 * | 5/2003 | Beaumont et al. .......... | 345/738 |

FOREIGN PATENT DOCUMENTS

JP    2000-504447    4/2000

OTHER PUBLICATIONS

Rabinovitch, E., Communication Technology Proceedings, 2000, WCC—ICCT 2000. International Conference on vol. 1, Aug. 21-25, 2000, pp. 817-821.*
One page from www.dictionary.com lists the definitin of tie-up.*

* cited by examiner

*Primary Examiner*—Jason Cardone
*Assistant Examiner*—Thomas Duong
(74) *Attorney, Agent, or Firm*—Oblon, Spivak, McClelland, Maier & Neustadt, P.C.

(57) ABSTRACT

An electronic service system is formed by a main site server system and a partner site server system. The main site server system carries out a remote updating of contents of tie-up pages at the partner site server system, when the authentication between the main site server system and the partner site server system succeeds. The partner site server system maintains tie-up pages related to a partnership between the main site and the partner site, and original pages of the partner site.

10 Claims, 10 Drawing Sheets

FIG.14
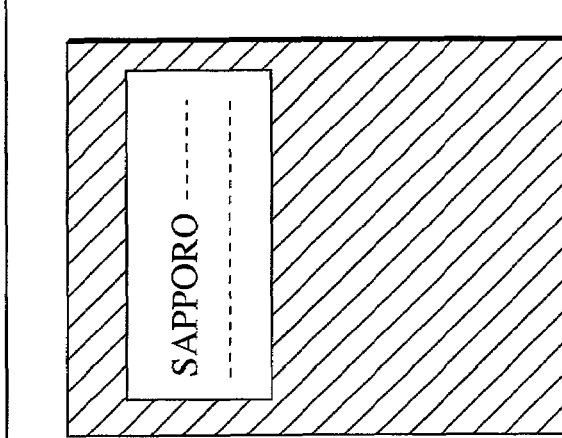
(a) MAIN SITE A
MAIN SITE CONTENTS
TOKYO
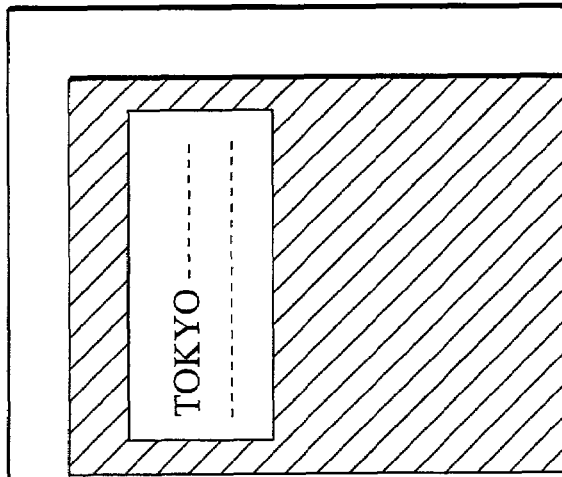
(b) PARTNER SITE B
TIE-UP CONTENTS
SAPPORO
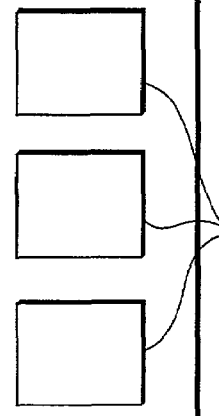
ORIGINAL CONTENTS

ELECTRONIC SERVICE SYSTEM USING MAIN SITE SERVER AND PARTNER SITE SERVER

BACKGROUND OF THE INVENTION

1. Field of the Invention

The present invention relates to an electronic service system for providing services such as electronic commerce, information providing, etc., on network such as the Internet.

2. Description of the Related Art

Many of the electronic shop or electronic commerce systems and electronic services (information retrieval, portal site, electronic bulletin board, etc.) on the Internet are constructed on a basis of the WWW (World Wide Web) system. On the client computers to be used by users of these electronic shops and electronic services, a software called WEB browser (or simply browser) is operated. The user makes an access from the WEB browser to a server computer of the electronic shop at which the purchase of goods through the Internet is desired or a server computer that provides the desired electronic service, and carries out viewing of goods information, goods purchase procedure, information retrieval, information exchange, etc.

On the server computer, a program for executing functions of the electronic shop or the electronic service is operated, to carry out the sales processing such as presentation of goods description or price to a customer, inventory check upon receiving an order from a customer, payment processing, and delivery arrangement, etc., for example. There are also cases where the server computer manages the past transaction logs according to the user information of the customers and provides services such as goods recommendation suitable to each customer and discount sales. The server computer may also carry out communications with computers of the other service companies as in the case of credit card settlement, for example.

The WEB browser on the client computer and the electronic shop or electronic service program on the server computer carry out communications using a WWW standard communication protocol called HTTP. In the HTTP protocol, a set of request and reply is used as a basic unit of communications such that when a request containing an identifier of the processing request called URL and any necessary information associated with that request is sent, a reply containing data such as HTML document for displaying the processing result will be returned. In the electronic commerce, the request is sent from the client computer toward the server computer, and the reply is sent from the server computer toward the client computer.

Usually, in the electronic commerce on the Internet, the user authentication is carried out to fulfill the need related to the security. In the user authentication, a password specific to the electronic shop or electronic service is used to verify that it is a legitimate user, and then an access to a menu on the server computer is permitted. Here, the user information is utilized not only for judging whether or not to permit an access by the user, but also for obtaining the user specific preference information based on the past access logs as mentioned above or for controlling preferential treatment according to a user class. Also, the more strict user authentication is necessary especially in the case of charging an amount to be paid for the purchased goods in the electronic commerce, in order to deal with the illegal act such as the pretending by the malicious user.

Now, such an electronic commerce (EC) or electronic service on the Internet is becoming very popular in recent years in conjunction with the advance of IT (Information Technology), and it is said that a practice of providing commerce or service on the WEB site can make it possible to start a business with respect to the whole world covered by the Internet at relatively low cost, but there are also several problems such as the following.

Problem 1: Site management such as contents updating is tedious.

In order to make the WEB site attractive to users, there is a need to update contents frequently such that the users will be visiting the WEB site many times, but a small scale WEB site has limited human resources that can be directed to the site contents updating such that this limitation can result in the lowering of the competitiveness as the EC site. Although there is an option to introduce the automatic updating tools, the cost for introducing such tools can be a problem.

Problem 2: Smooth regional service extension is difficult.

When the information providing site contemplates the regional service extension by posting locally limited regional information (such as a train transfer guide, for example), there are cases where it is preferable for the original operator (provider) to maintain the original site design and use the locally limited regional information only in some limited contents so as to take the advantage of the already established brand name value while entrusting the site operation to a local operator of each region. This strategy is important in a sense of avoiding the risk associated with the regional service extension and eliminating tasks for managing many sites. In other words, what is desired is a framework in which the outsourcing of the site operation is possible while using the single brand name.

Problem 3: Opportunities for finding potential users are limited.

The success of the EC site critically depends on how to promote actual visits to the WEB site by many end-users, after all, unless it has a special feature such as contents with special appeals to some maniac users. Consequently, it is preferable to be able to post many business information on the WEB from a viewpoint of the EC site operation. For example, it can happen that a small scale site with many portal sites and interconnecting links will have a greater chance of being visited by users compared with an EC site of a large scale operator which can only be accessed electronically at a single URL. Of course, the large scale operator may have some other advantages such as the established brand image, the ability to utilize commercial media other than the Internet (such as commercial messages), the scale cost merit in relation to the inventory management and the distribution, etc., but as far as the electronic media are concerned, the crucial factor is to have the exposure to the users at as many sites as possible.

Conventionally, links by banner advertisements have been available as a way of realizing such a partnership, but the space available for the banner advertisements is limited and the merit of the partner site for presenting features of the EC site is limited by definition to just the banner advertisement fee, so that this technique has only a limited effect.

As described, conventionally, the site management to promote many visits to the WEB site by users has been indispensable at the WEB site for providing the electronic commerce or the electronic service, but the limited human resources available for this purpose has been a problem for a small scale operator.

On the other hand, from a viewpoint of a large scale operator, it can hardly be said that the advantages of being a large scale operator are fully taken in operating the EC site, especially in the electronic environment, and a scheme for expanding business to many sites while taking advantage of the brand image has been needed.

BRIEF SUMMARY OF THE INVENTION

It is therefore an object of the present invention to provide an electronic service system which is capable of realizing effective partnership among sites.

According to one aspect of the present invention there is provided an electronic service system, comprising: a first server system, capable of carrying out communications with client systems of electronic service users, which is configured to provide electronic services as a main site; and a second server system, capable of carrying out communications with the first server system and the client systems, which is configured to provide the electronic services as a partner site of the main site; the first server system having: a first server authentication processing unit configured to carry out authentication with the second server system; and an updating unit configured to carry out a remote updating of contents of tie-up pages at the second server system, at a prescribed timing when the authentication succeeds; and the second server system having: a second server authentication processing unit configured to carry out authentication with the first server system, at a time of receiving the remote updating; a tie-up page unit configured to maintain the tie-up pages related to a partnership between the main site and the partner site; and an original page unit configured to maintain original pages of the partner site.

According to another aspect of the present invention there is provided a partner site server system, capable of carrying out communications with client systems of electronic service users, for providing electronic services as a partner site of a main site server system that is providing the electronic services as a main site, the partner site server system comprising: an authentication processing unit configured to carry out authentication with the main site server system, at a time of receiving a remote updating of contents of tie-up pages at the partner site server system from the main site server system; a tie-up page unit configured to maintain the tie-up pages related to a partnership between the main site and the partner site; and an original page unit configured to maintain original pages of the partner site.

According to another aspect of the present invention there is provided main site server system, capable of carrying out communications with client systems of electronic service users, for providing electronic services as a main site of a partner site server system for providing the electronic services as a partner site, the main site server system comprising: an authentication processing unit configured to carry out authentication with the partner site server system; and an updating unit configured to carry out a remote updating of contents of tie-up pages at the partner site server system, at a prescribed timing when the authentication succeeds.

According to another aspect of the present invention there is provided a site management method for a partner site server system, capable of carrying out communications with client systems of electronic service users, for providing electronic services as a partner site of a main site server system that is providing the electronic services as a main site, the site management method comprising: carrying out authentication with the main site server system; and receiving a remote updating of contents of tie-up pages at the partner site server system from the main site server system, at a prescribed timing when the authentication succeeds.

According to another aspect of the present invention there is provided a site management method for a main site server system, capable of carrying out communications with client systems of electronic service users, for providing electronic services as a main site of a partner site server system for providing the electronic services as a partner site, the site management method comprising: carrying out authentication with the partner site server system; and carrying out a remote updating of contents of tie-up pages at the partner site server system, at a prescribed timing when the authentication succeeds.

According to another aspect of the present invention there is provided a computer program product for causing a computer to control a partner site server system, capable of carrying out communications with client systems of electronic service users, for providing electronic services as a partner site of a main site server system that is providing the electronic services as a main site, the computer program product comprising: first computer program codes for causing the computer to carry out authentication with the main site server system; and second computer program codes for causing the computer to receive a remote updating of contents of tie-up pages at the partner site server system from the main site server system, at a prescribed timing when the authentication succeeds.

According to another aspect of the present invention there is provided a computer program product for causing a computer to control a main site server system, capable of carrying out communications with client systems of electronic service users, for providing electronic services as a main site of a partner site server system for providing the electronic services as a partner site, the computer program product comprising: first computer program codes for causing the computer to carry out authentication with the partner site server system; and second computer program codes for causing the computer to carry out a remote updating of contents of tie-up pages at the partner site server system, at a prescribed timing when the authentication succeeds.

Other features and advantages of the present invention will become apparent from the following description taken in conjunction with the accompanying drawings.

BRIEF DESCRIPTION OF THE DRAWINGS

FIG. 14 is a diagram for explaining a case of constructing exemplary regional information sites by utilizing one embodiment of the present invention.

DETAILED DESCRIPTION OF THE INVENTION

Referring now to FIG. 1 to FIG. 14, the electronic service system according to one embodiment of the present invention will be described in detail.

In the following, the exemplary case of the electronic commerce at an electronic shop or the like on the Internet will be described, but the present invention is also applicable to networks other than the Internet, as well as to systems handling network services such as information providing or transactions/contracts not within the category of the electronic commerce.

Figure 1:
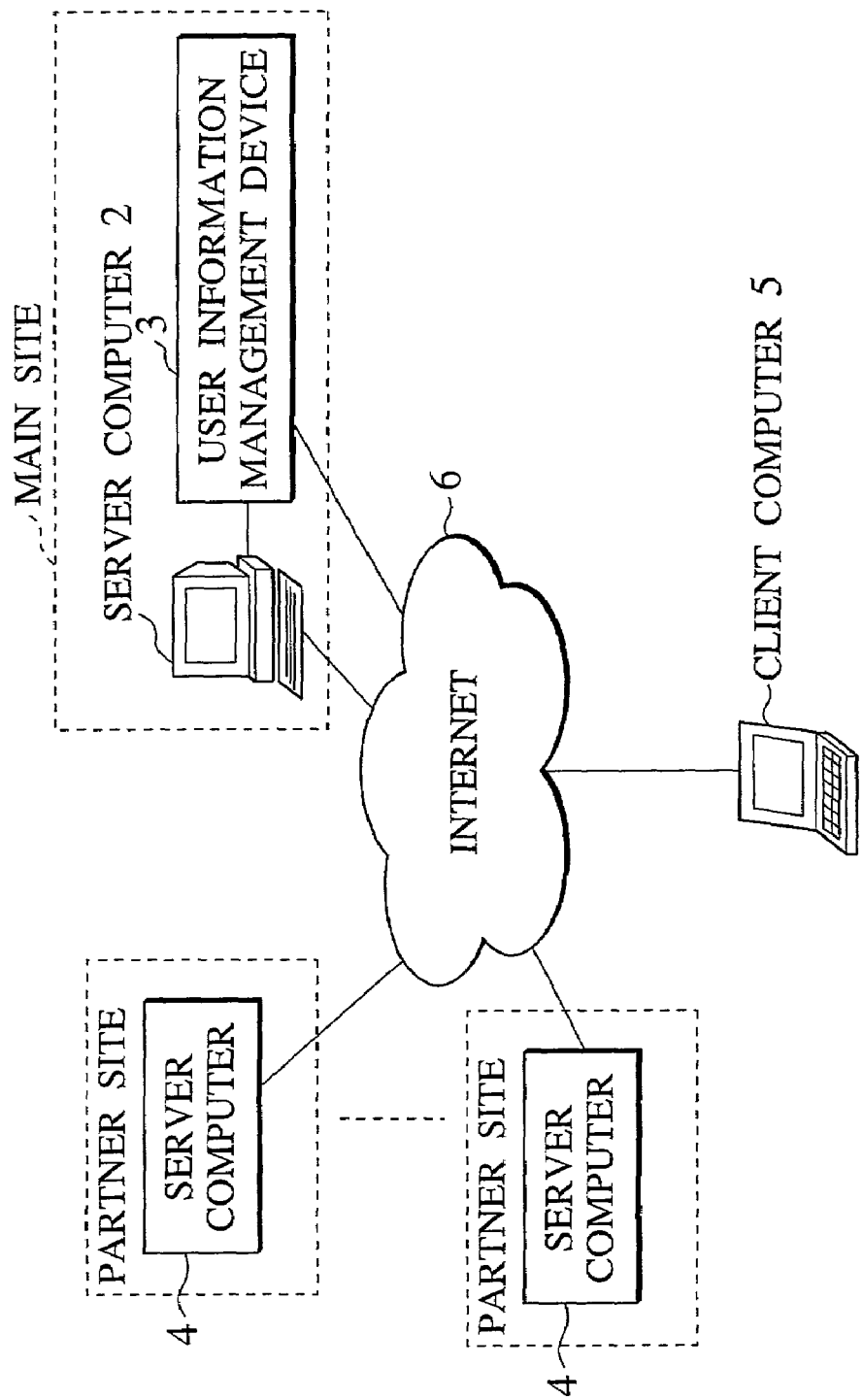
FIG. 1 is a diagram showing an exemplary network configuration of an electronic service system according to one embodiment of the present invention.

FIG. 1 shows an exemplary network configuration of the electronic commerce system according to this embodiment.

This electronic commerce system comprises a server computer 2 and a user information management device 3 associated with the server computer 2 that constitute a main site for providing the electronic shop service, server computers 4 that constitute partner sites for providing the electronic shop service, and a client computer 5 of a user for utilizing the electronic shop service provided by the main site and the partner sites, all of which are connected through the Internet 6. Although FIG. 1 shows only one client computer 5, the system has a plurality of client computers 5 in general.

Here, the operator of the main site is assumed to be a large scale operator who is famous nationwide and who has the techniques necessary for the site operation and management, for example. On the other hand, the operator of each partner site is assumed to be a small scale operator who is wishing to start his own site but who has limitations related to the techniques and cost. Then, this system adopts a scheme in which the main site operator forms a partnership with each partner site operator such that both parties can benefit from this system. Here, the partnership can be such that the main site operator supports the site starting and the site operation and management of the partner site operator, the partner site operator has the identical contents (pages) as the main site operator, the partner site operator pays some fee such as a support fee or a handling fee to the main site operator, etc., for example.

In this embodiment, it is assumed that there are a plurality of partner sites (server computers 4), the main site operator and a plurality of partner site operators are different from each other (note that ann operator is not necessarily a juridical person), and the main site operator and the partner site operators have a contract regarding the partnership of sites (note that there can be cases where there is only one partner site, or cases where one partner site operator has a plurality of partner sites with respect to the same main site). There may be a plurality of main sites (server computers 2/user information management devices 3) (note that there can be cases where there are a plurality of main site operators, or cases where one main site operator has a plurality of main sites, etc.), but the following description will focus on one main site.

In the following, the user refers to a user of the client computer 5 (those who operate the server computer 2 or 4 will be referred to as managers).

The user utilizes the electronic shop service on the Internet 6 as a customer, and operates the client computer 5 for the purpose of carrying out a desired transaction (making a desired contract) such as that of purchasing goods, ordering home delivery service, reserving a seat or a room, renting something, etc., or for the purpose of acquiring information to that end. Note that, from a viewpoint of the client computer 5, there is no particular difference in terms of the system among the main site and the partner sites.

On the client computer 5 to be used by the user in order to utilize the electronic shop service, the WEB browser is operated. The user utilizes the electronic shop service (carries out goods information viewing or goods purchasing procedure, for example) by accessing the desired server computer 2 or 4 that provides the desired electronic shop service from which the user wishes to purchase goods, for example, from the WEB browser through the Internet, and repeating operations such as viewing a page screen displayed on the WEB browser, entering data according to the need, and pressing various buttons (through the exchanges between both computers by transmitting various requests and receiving replies). Of course, it is also possible to use software or the like that is dedicated to the utilization of the electronic shop service instead of the WEB browser, but the exemplary case of using the WEB browser will be described in this embodiment.

Also, the client computer 5 has a mechanism for carrying out communications with the server computer 2 or 4 for providing the electronic shop service through the Internet 6 (such as communication software and communication interface device, for example).

Note that the client device 5 can be connected to the Internet 6 either via the Internet service provider (not shown) or without using the Internet service provider.

Also, the client computer 5 may be a cellular phone terminal or the like that has the Internet function, for example, rather than a general purpose computer.

On the server computer 2 of the main site operator, the electronic shop program is operated to provide various electronic shop services of that site such as the sales processing including the presentation of descriptions and prices of goods or service contents, the inventory checking upon receiving an order from the user, the payment processing, and the delivery arrangement in the case of the goods sales service site, for example, with respect to the user of the client computer 5. The electronic shop program on the server computer 2 carries out the processing while managing necessary information such as information regarding goods catalog, information regarding inventory, information regarding individual transaction content, and information regarding actual payment and delivery, in a database.

Also, the server computer 2 has a mechanism for carrying out communications with the user information management device 3, the server computer 4 of the partner site, and the client computer 5 (such as communication software and communication interface device, for example). The communications with the user information management device 3 or the server device 4 may be carried out through the Internet 6.

On the server computer 4 of the partner site operator, the electronic shop program is also operated. As will be described in detail below, the partner site has tie-up pages related to the partnership with the main site and the original pages unique to the own site (there can be cases where there is no original pages). Then, the server computer 4 carries out the similar processing as the server computer 2 described above for accesses with respect to the original pages, but with respect to the tie-up pages, there are cases in which the similar processing is carried out as in the cases of the original pages, and cases in which a part or whole of the processing is not carried out by the server computer 4 itself but information is notified to the main site side so as to entrust that processing.

Note that the server computer 4 also has a mechanism for carrying out communications with the server computer 2 or the user information management device 3 of the main site, and the client computer 5 (such as communication software and communication interface device, for example). The communications with the server computer 2 or the user information management device 3 may be carried out through the Internet 6.

Note also that the user information management device 3 can be an element provided on the server computer 2, or a computer or the like that is independent from the server computer 2. In the latter case, a device other than the server computer 2 that carries out communications with the user information management device 3 may carry out communications either directly with the user information management device 3 or through the server computer 2.

Next, the contents of the partner site will be described.

Figure 2:
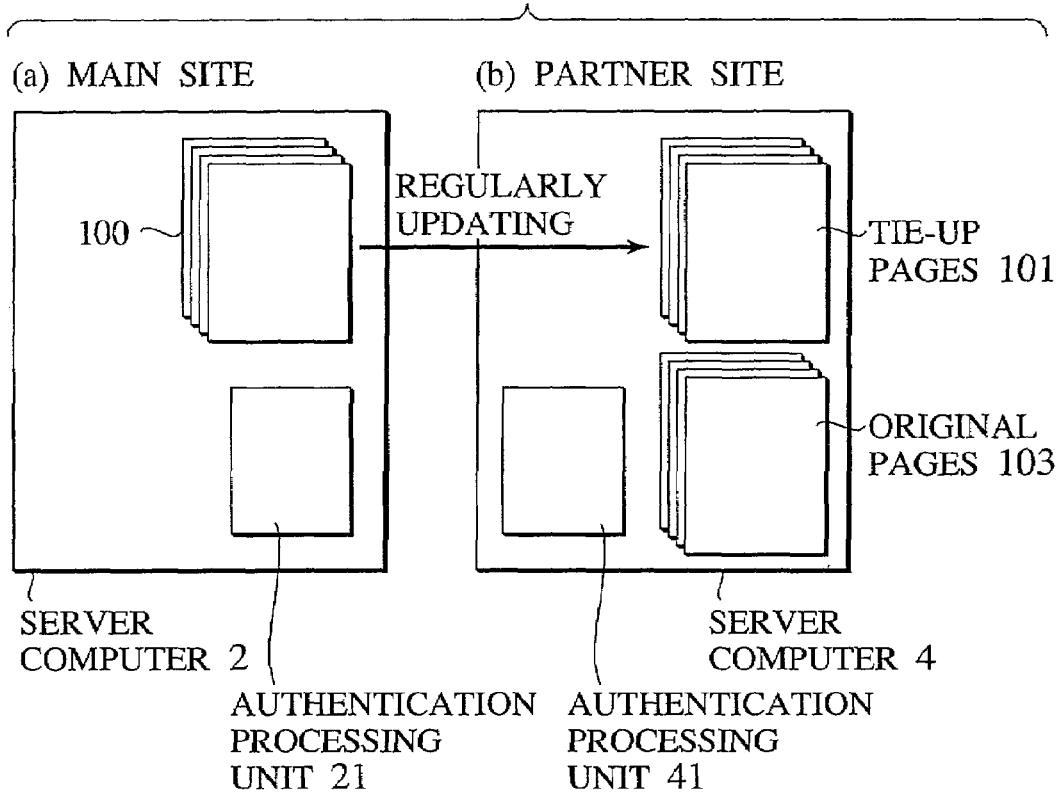
FIG. 2 is a diagram for explaining one exemplary contents configuration and updating method for a partner site in the electronic service system of FIG. 1.

As shown in FIG. 2, the partner site has tie-up pages 101 for presenting contents 100 of the main site as inherited from the main site, and original pages 103 that are created by the partner site itself. Note that there can be cases where the tie-up pages 101 or the original pages 103 actually contain a single page. There can also be cases where there is no original pages.

There are many ways for differentiating the tie-up pages and the original pages at the partner site. For example, it is possible to use a style in which the tie-up pages inherited from the main site provide main services while the original pages provide original services such as that for providing information targeting at a specific region, selling goods originating from a specific region, etc., a style in which the original pages also provide nationwide services similar to the tie-up pages, or a style in which there is no original pages.

Note that the main site may or may not have pages other than the contents 101 corresponding to the tie-up pages 101, but in this embodiment, only the contents 100 corresponding to the tie-up pages 101 will be described as far as the main site is concerned.

An amount of the tie-up pages, a ratio between the tie-up pages and the original pages, and an amount of the original pages at the partner site are arbitrary. Note however that, as will be described in detail below, in the case of adopting a scheme in which the level of contribution of the tie-up pages with respect to the operation of the entire site is to be evaluated and appropriately reflected in the partnership handling fee, the amount of tie-up pages, the ratio between the tie-up pages and the original pages, and the amount of the original pages can be important factors in calculating the level of contribution.

As shown in FIG. 2, among the contents provided at the partner site, as far as the tie-up pages inherited from the main site are concerned, the operation management such as page updating is entrusted to the main site. In other words, when the updating of the page contents of the main site is carried out, the tie-up pages of all the partner sites are also updated.

In order to do this, there is a need to carry out the appropriate authentication procedure between the main site and the partner site in order to verify that it is the proper updating request. To this end, the server devices 2 and 4 have authentication processing units 21 and 41, respectively. They actually carries out the mutual authentication processing based on an appropriate security mechanism. When the authentication is completed successfully, the new pages will be distributed to the partner sites.

Figure 3:
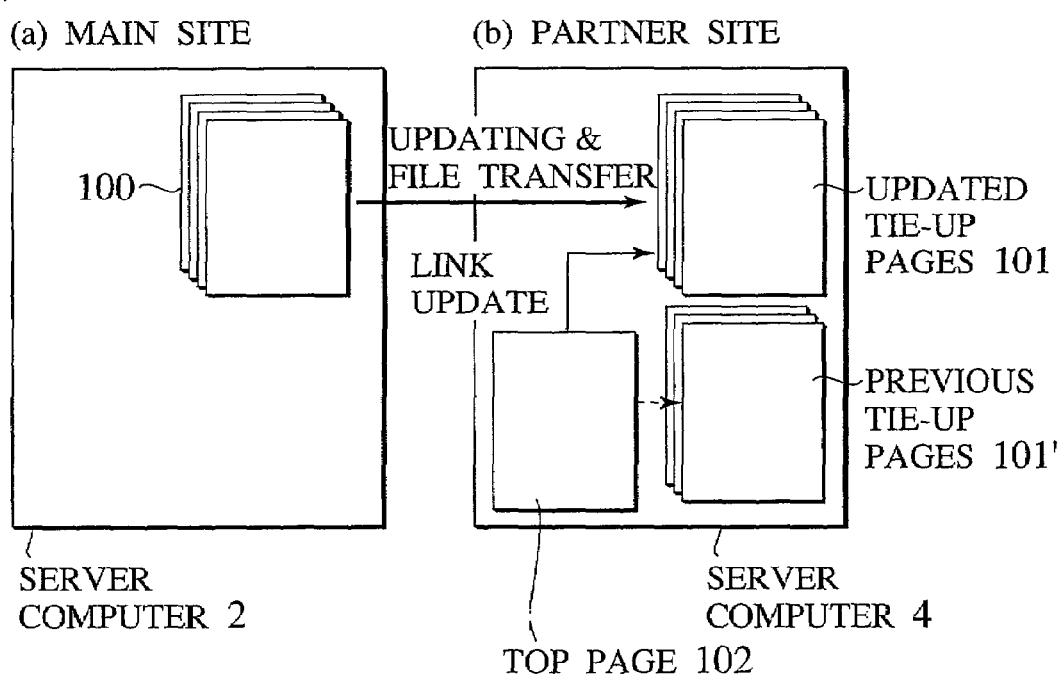
FIG. 3 is a diagram for explaining another exemplary contents configuration and updating method for a partner site in the electronic service system of FIG. 1.

The update of the tie-up pages may be realized by overwriting data. Alternatively, as shown in FIG. 3, it is also possible to rewrite the WEB links directly, or write the new pages as files on the server computer 4 of the partner site 4 once and then change links to these local copies after a prescribed approval processing is carried out.

Figure 4:
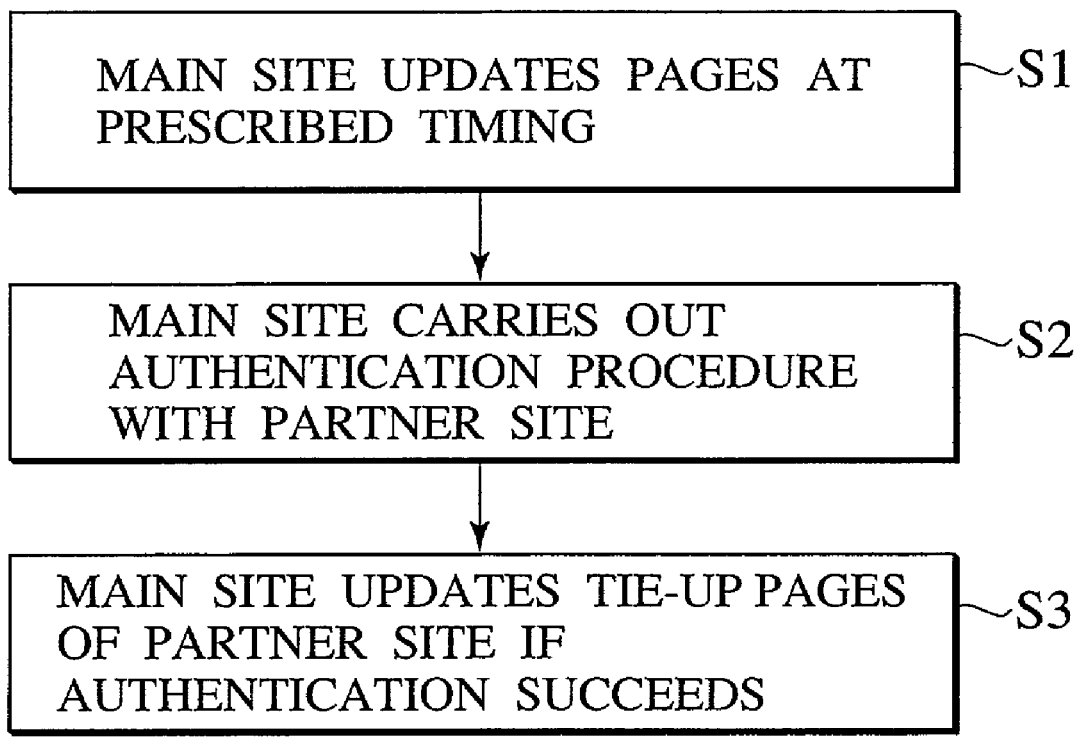
FIG. 4 is a flow chart for one exemplary procedure for updating tie-up pages at a partner site in the electronic service system of FIG. 1.

FIG. 4 shows one exemplary procedure for updating the tie-up pages. At the main site, the updating of pages is carried out at prescribed timings (regularly, for example) (step S1). When the timing for updating pages arrives, the authentication procedure is carried out between the main site and the partner site (step S2). When the authentication succeeds, the main site updates the tie-up pages of the partner site (step S3).

Figure 5:
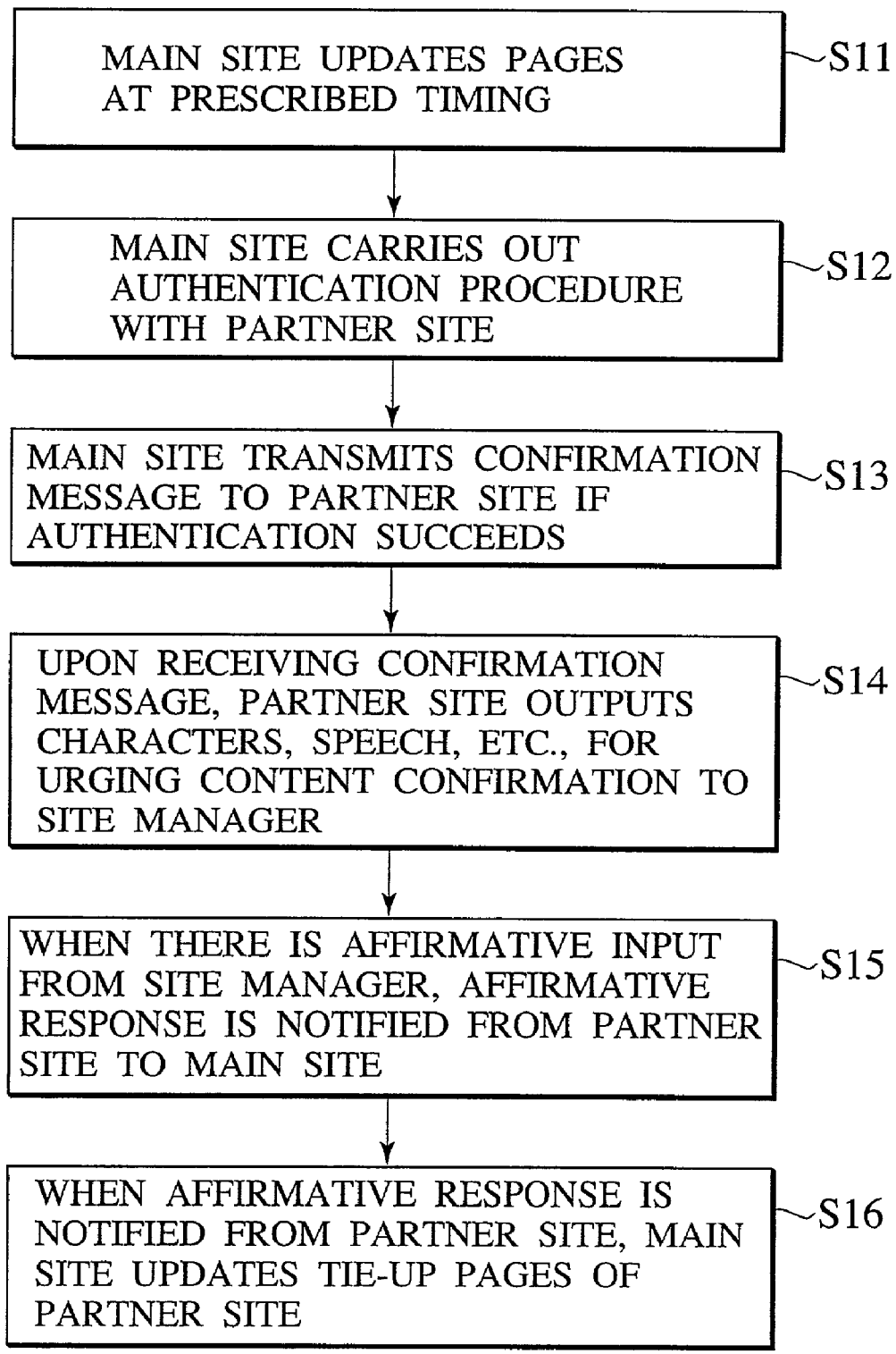
FIG. 5 is a flow chart for another exemplary procedure for updating tie-up pages at a partner site in the electronic service system of FIG. 1.

FIG. 5 shows another exemplary procedure for updating the tie-up pages. At the main site, the updating of pages is carried out at prescribed timings (regularly, for example) (step S11). When the timing for updating pages arrives, the authentication procedure is carried out between the main site and the partner site (step S12). When the authentication succeeds, the main site transmits a confirmation message for urging the content confirmation to the site manager of the partner site (step S13). Upon receiving this confirmation message, the partner site produces a character or speech output for urging the site manager to carry out the content confirmation (step S14). Then, when an input indicating that the confirmation is made is entered from the site manager, the partner site transmits an affirmative response message to the main site 8step S15). When the affirmative response message is received, the main site updates the tie-up pages of the partner site (step S16).

Note here that, if a negative input is entered from the site manager, a negative response message is transmitted from the partner site to the main site, and upon receiving the negative response message, the main site interrupts the processing for updating the tie-up page of the partner site once. Then, the procedure of FIG. 5 is tried again after a prescribed automatic or manual procedure is carried out.

On the other hand, the operation management such as page updating is carried out by the partner site itself as far as the original pages created by the partner site itself among the contents provided at the partner site are concerned.

The update of the original pages may also be realized by overwriting data, or by rewriting the WEB links directly, or by writing the new pages as files on the server computer 4 of the partner site 4 once and then changing links to these local copies after a prescribed approval processing is carried out.

Now, when a request from the client computer 5 to the tie-up page at the partner site is made, there can be cases where a processing for responding to this request becomes necessary. For example, when a request for purchase of some goods handled by the electronic commerce is received, the sales processing such as the inventory check, the payment processing, and the delivery arrangement may be necessary. Such a processing in response to the request can be handled in various ways, such as the following.

(1) The processing is carried out by the partner site, for all the requests.

(2) The processing is entrusted to the main site by notifying the request to the main site, for all the requests.

(3) The processing is carried out by the partner site, according to a response received after notifying the request to the main site first, for all the requests.

(4) Any one of the above described (1) to (3) is selectively used according to the content of each request.

Figure 6:
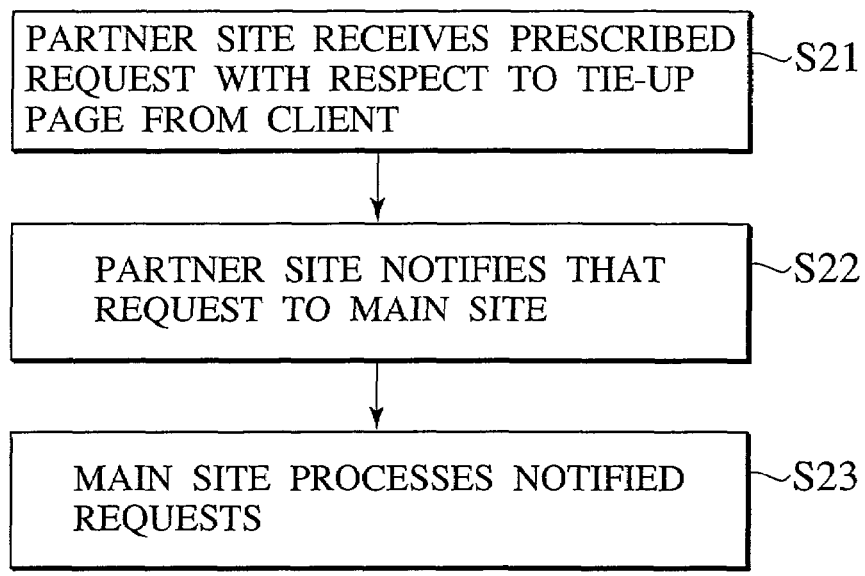
FIG. 6 is a flow chart for one exemplary procedure for processing a request in the electronic service system of FIG. 1.

FIG. 6 shows an exemplary procedure in the above described (2). The partner site receives a prescribed request to the tie-up page from the client (step S21). The partner site notifies this request to the main site (step S22). The main site carries out the processing for the notified request (step S23).

Figure 7:
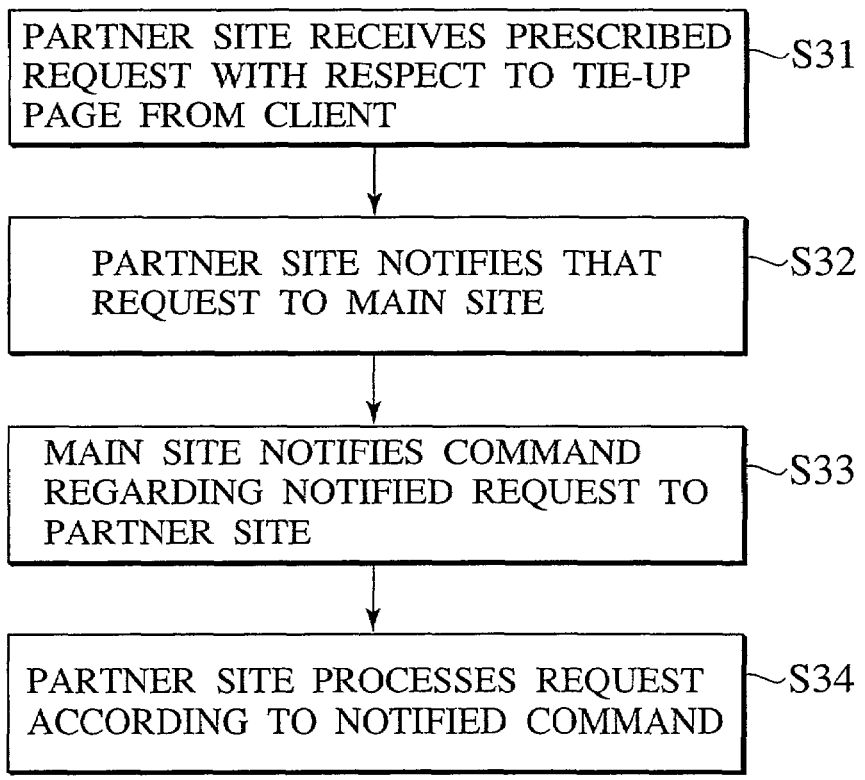
FIG. 7 is a flow chart for another exemplary procedure for processing a request in the electronic service system of FIG. 1.

FIG. 7 shows an exemplary procedure in the above described (3). The partner site receives a prescribed request to the tie-up page from the client (step S31). The partner site notifies this request to the main site (step S32). The main site notifies a command regarding the notified request to the partner site (step S33). The partner site carries out the processing for that request according to the notified command (such as whether the inventory check for the ordered goods should be carried out or not, for example) (step S34).

Note that, when there is a request from the client computer 5 to the original page of the partner site (such as a request for purchase of some goods handled by the electronic commerce or a request for information transfer, for example), the processing is carried out by the partner site itself.

Note also that, in the above, the partner site has been described as having the same contents as the main site in forms of the tie-up pages, but the tie-up pages of the partner site may be partly different from the corresponding contents of the main site instead of inheriting all the contents of the main site. Also, the differences between the tie-up pages of the partner site and the corresponding contents of the main site may be set differently for different partner sites.

Figure 8:
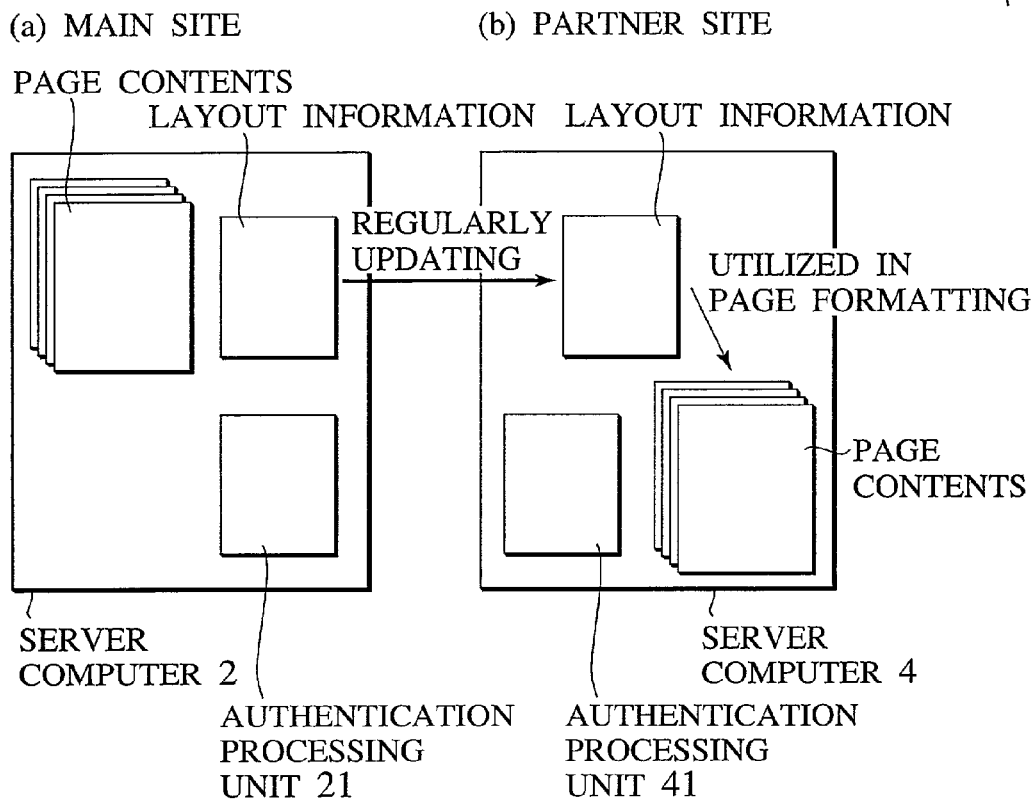
FIG. 8 is a diagram for explaining a case of inheriting a framework from a main site at a partner site in the electronic service system of FIG. 1.

Also, regarding the tie-up pages, it is possible to inherit only the framework such as a page layout or a user interface as shown in FIG. 8, for example, instead of inheriting a part or all of the contents of the main site. In this way, it is possible to take the advantage of the brand image of the main site or the user interface that is already familiar to the users through the main site can also be utilized at the partner sites. In this case, the layout information is automatically updated from the main site side at a time of the regular layout change or the like.

It is also possible to provide only a link to the main site at the page of the partner site and some sort of management is entrusted from the partner site to the main site, instead of inheriting the contents from the main site as described above.

In the above, the case of entrusting the management for updating the tie-up pages of the partner site to the main site has been described, but it is also possible to entrust the other management from the partner site to the main site. The basic idea here is to reduce the amount of pages that have to be managed by the partner site side. Namely, from a viewpoint of the management, it is possible for the main site side to carry out various processing other than the page updating on behalf of the partner sites. There can also be a case where the main site and the partner sites are put under the common management, and the main site carries out that management as a representative among the main site and the partner sites.

Figure 9:
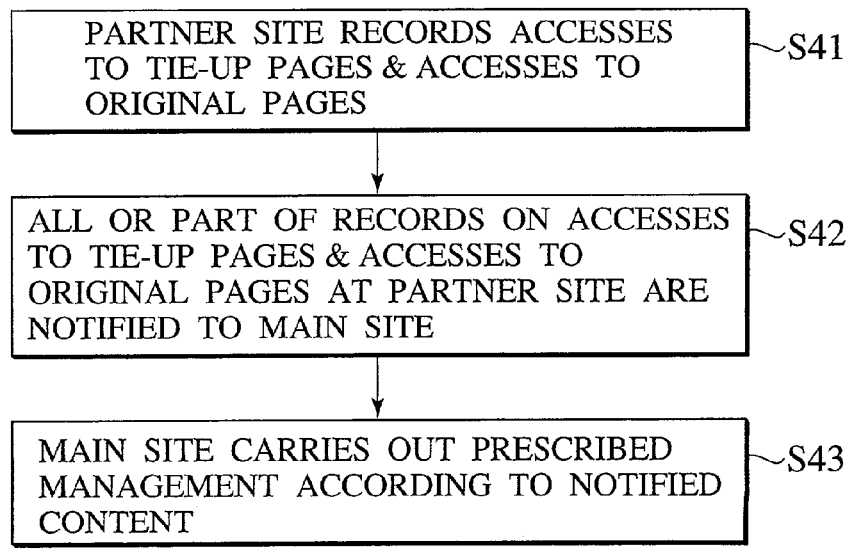
FIG. 9 is a flow chart for one exemplary procedure for processing related to a management in the electronic service system of FIG. 1.

FIG. 9 shows the exemplary basic procedure in these cases. The partner site records the accesses to the tie-up pages and accesses to the original pages (step S41). All or part of the records of the accesses to the tie-up pages and the accesses to the original pages are then notified to the main site (step S42). The main site carries out a prescribed management (customer management, security management, partnership handling fee management, for example) according to the notified content (step S43). Of course, it is also possible for the main site to acquire the information from the partner site according to the need instead of notifying the information from the partner site to the main site at the step S42.

As the management other than the page updating that the main site carries out on behalf of the partner sites (including the case where the main site carries out the management as a representative of the main site and the partner sites) includes the security management, the user log or user information management or the customer management, the partnership handling fee management, etc., for example, which will now be described in further details.

Figure 10:
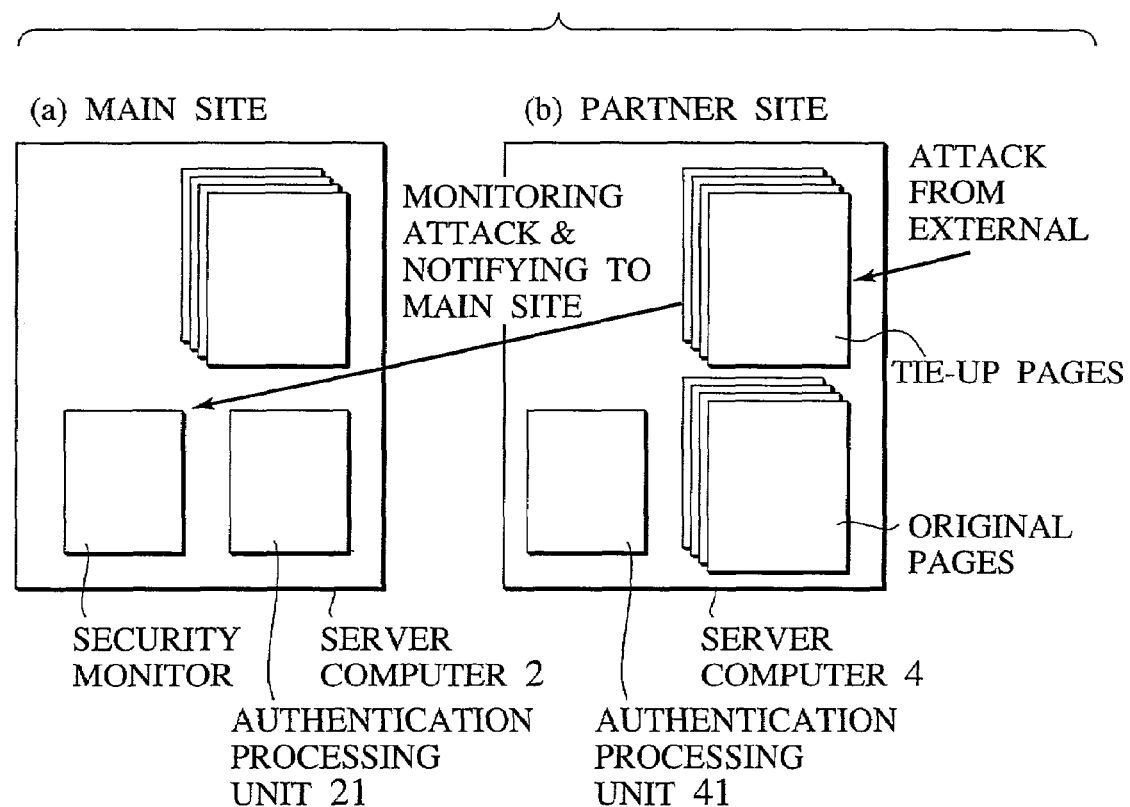
FIG. 10 is a diagram for explaining a case of supporting a cracking detection and protection at a main site in the electronic service system of FIG. 1.

(1) The Security Management:

For example, as shown in FIG. 10, the main site side can support the detection of cracking (intrusion) with respect to pages and the protection against it. It is also possible to provide this management as a service option and add some fee to the partnership handling fee.

Figure 11:
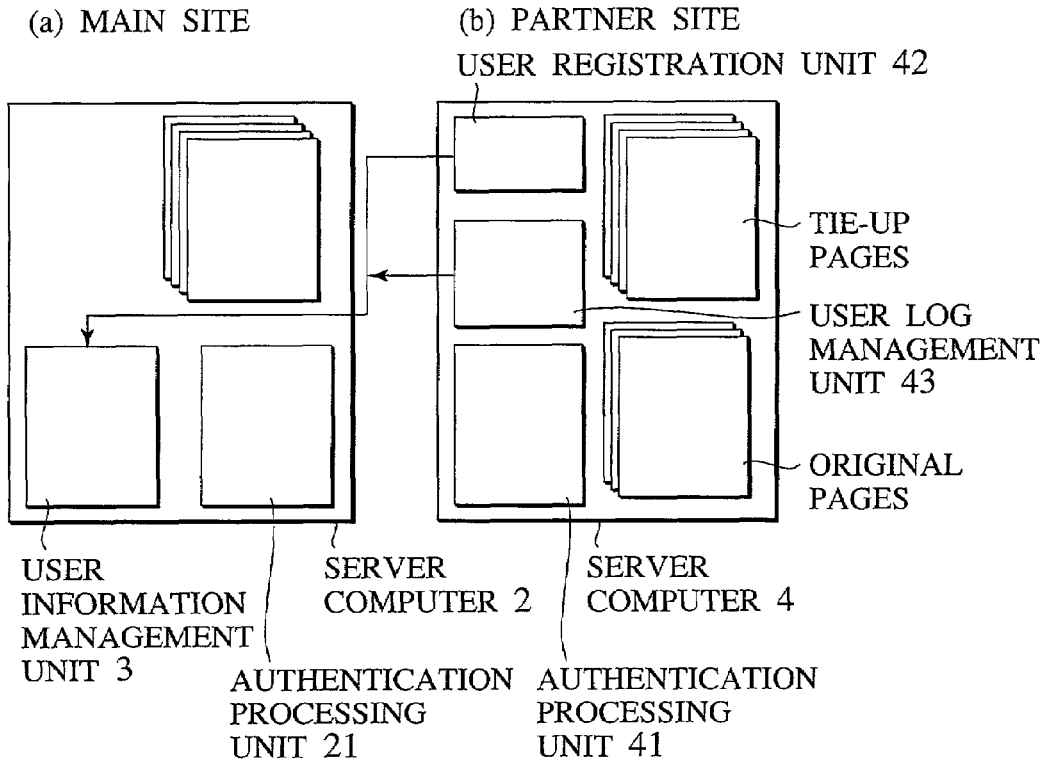
FIG. 11 is a diagram for explaining a case of carrying out a centralized management of user information at a main site in the electronic service system of FIG. 1.

(2) The User Log or User Information Management or the Customer Management:

For example, as shown in FIG. 11, the user information management device 3 collects the access log information of the users on the server computers 2 and 4 (through a user log management unit 43, for example), collects a new user registration information (through a user registration unit 42, for example), and carries out the centralized management of these information. In this way, the user management resources at the partner sites side which are generally small scale operators can be reduced and the direct marketing (such as the notification of new products using direct mails, for example) with respect to the users can be carried out by the main site side on behalf of the partner sites. It is also possible to provide this management as a service option and add some fee to the partnership handling fee.

Of course, there can be cases where the partner site side wishes to carry out its own marketing activity by managing the user logs, and in such cases, the setting regarding pages whose user information the partner site wishes to utilize can be made by the contract in advance, such that this user information can also be managed by the partner site as well.

(3) The Partnership Handling Fee Reflecting the Access Logs:

The above described user log information can be used for the purpose of reflecting the access logs in the partnership handling fee of the partner site, besides its use for the purpose of marketing, in the following ways for example.

In the case where the partner site has popular original pages and the customer attraction power due to these original pages has contributed to the contents sales profit of the main site side as well, the partnership handling fee can be discounted.

In the case where the number of user accesses per month has exceeded a certain amount, the partnership handling fee can be discounted as an incentive.

The partnership handling fee can be determined according to the partnership type (link only, template only, contents inheriting, etc.) and the choice of the optional management services as described above.

In such cases where the access log content itself affects the fee to be paid by the partner site to the main site, there is a need to properly share the correct information (without alteration or the like). To this end, the alteration can be prevented by attaching a contents certification code using appropriate hash function or the like and carrying out the consistency verification at a time of reading the access log information in a log management system, for example.

Figure 12:
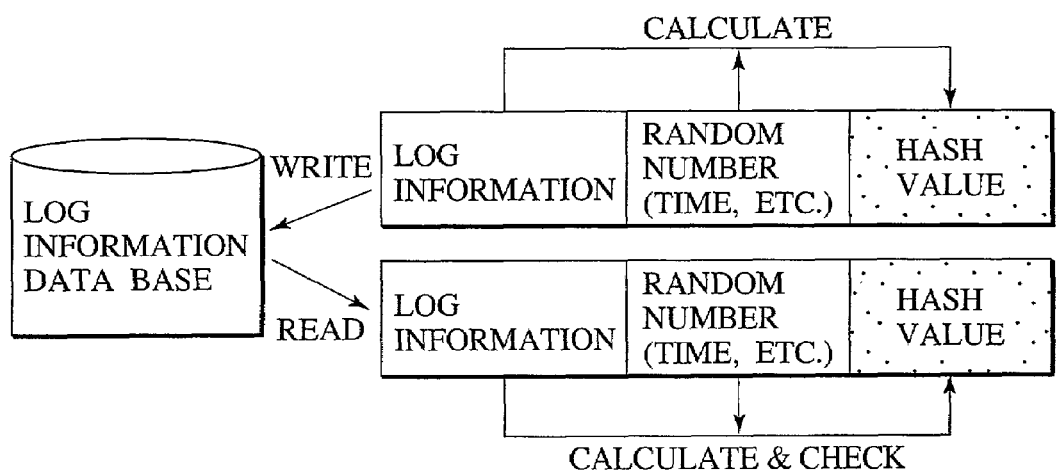
FIG. 12 is a diagram showing an exemplary configuration of a log management system that can be used in the case explained in FIG. 11.

FIG. 12 shows an exemplary configuration of such a log management system. In FIG. 12, the writing is carried out by the user registration unit 42 or the user log management unit 43 of the partner site, for example. Also, the log information database is provided at the partner site side, for example. The verification function is provided on both sites, for example (or only the main site has the verification function).

It is also possible to use a scheme in which the main site has the writing function and the verification function is provided on both sites (or only the partner site has the verification function). It is also possible to use a scheme in which the writing function and the verification function are provided on both sites.

(4) The Partnership Handling Fee Collecting at a Time of Purchase:

There are various other possible ways for collecting the partnership handling fee. For example, in the case where main site offers goods in a limited number for sale, and the partner site handles these goods at the tie-up pages, the partner site can transfer a certain handling fee to the main site side out of the fee collected from the customer in each transaction. This handling fee is to be determined as a part of the partnership handling fee, so that how much individual charge is to be allowed will be determined according to the relationship of demands and supplies between the main site and the partner site, for example.

In the following, some exemplary distributed EC sites utilizing the present invention will be described.

EXAMPLE 1

The Electronic Commerce Sites

Figure 13:
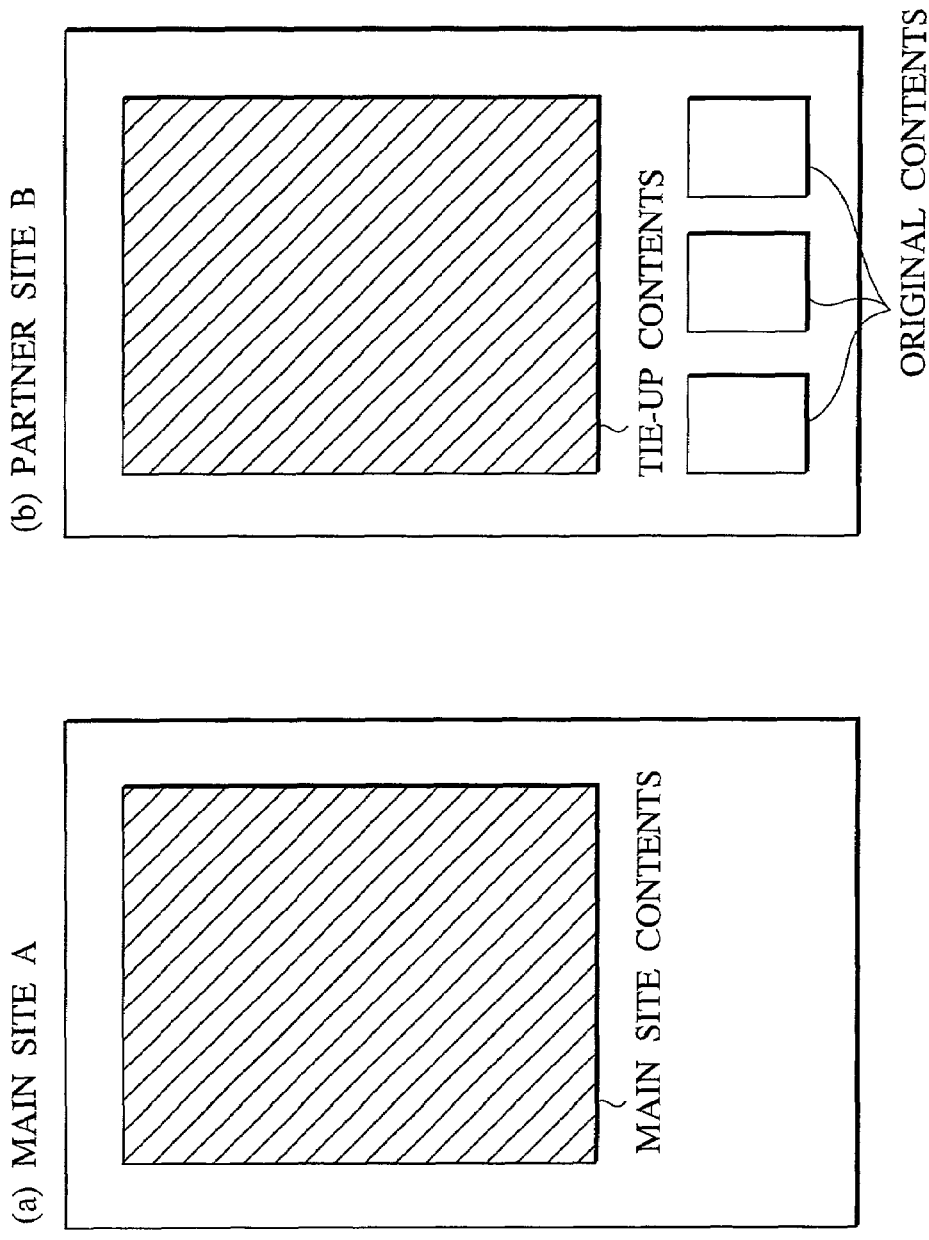
FIG. 13 is a diagram for explaining a case of constructing exemplary electronic commerce sites by utilizing one embodiment of the present invention.

FIG. 13 shows an exemplary case of constructing the electronic commerce sites at low cost on a basis of the tie-up pages. In FIG. 13, a part (a) shows an exemplary page configuration of the main site A, and a part (b) shows an exemplary page configuration of the partner site B.

Here, the exemplary case where the nationwide famous large scale operator A provides the main site and the partner site B that has made the partnership contract with that operator A starts the EC business will be considered. The partner site B is given a set of kits including tools for constructing the WEB site according to the contract with the operator A. These include a WEB template in compliance with the configuration of pages to be provided by the operator A to the partner site, and a manual for setting up a link to the partner site. The ratio of tie-up pages and the original pages can be set variously, but in the example of FIG. 13, it is assumed that the partner site B does not have much original business capacity so that there are only few (only pages 1 to 3) original pages.

In this case, the access rights are set up such that the original pages can be updated only by the manager of the partner site B, and the other pages can be updated only by the manager of the main site A. There is a choice regarding whether the manager of the partner site B should be capable of updating the tie-up pages or not. It is possible to give the access right to the manager of the partner site B as well in order to deal with the site trouble (including the machine malfunction) quickly, or it is possible not to give the access right to the manager of the partner site B from a standpoint that the updating of the contents of the operator A should not be permitted (in order to protect the brand image).

Once the access rights are set up appropriately, thereafter the updating of the contents for the tie-up pages is executed remotely from the operator A side. Namely, all the tasks regarding the WEB editing such as the switching of contents to those of the new products, the regular updating of the page layout, etc., will be done by the operator A on behalf of the partner site B. Thus it suffices for the partner site B to carry out the management of the original goods information in a limited number only.

When the user enters the partner site B for the first time, the user registration is carried out and the collected user information is transferred to the user information management device 3 of the operator A which carries out the centralized management of the user information. Similarly, the log of actions executed by the user at the partner site B is transferred to the user information management device 3 of the operator A and will be utilized in various marketing activities (such as direct mail sending, etc.) accounting for the user attribute and the user preference. Namely, the most of the related marketing activities such as providing various information to the users are also carried out by the large scale operator A on behalf of the partner site B.

As for the fee collecting, it is possible to pay a prescribed partnership handling fee in advance, and carry out all the accounting tasks at the partner site B side, or it is possible to pay a certain handling fee to the operator A in relation to the goods handled in the tie-up pages. However, in the latter case, there is a need for a system by which the charged amounts can be correctly maintained and the operator A can collect them (mainly a security protection mechanism for the charge information and a method for the operator A to acquire the charge information through a safe transfer path).

In this example, the exemplary case of a partnership with a partner site B which only has few original contents has been described, but there can also be cases where another site C having contents that are popular to some extent will form a partnership with the operator A in order to complement the contents. In such cases, it is possible to set different partnership handling fees for the site B and the site C according to a prescribed objective information.

One possibility is to set different classes of the partnership handling fees according to the amount of information (number of bytes or number of pages) of the tie-up contents and the amount of information (number of bytes or number of pages) of the original contents.

Also, in order to reflect the attractiveness of each contents, it is possible to record the access logs of the users at the site, checks how many accesses are made with respect to each one of the tie-up contents and the original contents, and evaluates the partnership handling fee according to the ratio of the accesses for the tie-up contents and the accesses for the original contents. For example, suppose there is a site D which has the same amount of the original pages as the site C. In such a case, the partnership handling fee will be the same for the site C and the site D according to the evaluation method based on the number of pages described above. However, if the site C has popular original contents that have attracted many user accesses, the partnership handling fee of the site C will be cheaper than that of the site D according to this evaluation method.

Besides that, it is also possible to provide a partner site incentive such as the discount of the partnership handling fee when the number of user accesses within a certain period of time has exceeded a prescribed amount.

Also, in the case of the free service sites operated by the advertisement income, the partnership handling fee can be determined on a basis of how many advertisements are advertisements of the main site side and how many advertisements are advertisements of the partner site side (that is, how much contribution the partner site has to the advertisement income).

Such partnership handling fee evaluation criteria should be determined by accounting for the business capacity, the attractiveness for users, and the actual customer attraction power of each partner site, so as to encourage the business effort of the partner site.

EXAMPLE 2

The Regional Information Sites (Template Only)

FIG. 14 shows an exemplary case of constructing the regional information sites in which the partner site specific to each region inherits only the layout of the main site. In FIG. 14, a part (a) shows an exemplary page configuration of the main site A, and a part (b) shows an exemplary page configuration of the partner site B.

Here, the man site A provides information such as town information, train transfer guide, etc., of the Metropolitan (Tokyo) area, while the partner site B provides the same service at Hokkaido region centered around Sapporo.

In this case, the synergy effect can be obtained by using the brand image and the user interface of the main site at the partner site as well and presenting advertisements or the like of Hokkaido version as well on various media. For this reason, the layout information of the site is given to the partner site B according to the partnership contract, and the partner site B side generates the contents according to this layout information. For example, various utilities such as a search engine and a robot for collecting time tables for the purpose of providing the transfer information are also given from the main site A to the partner site B when the contract is made. Namely, the contents of the site B are Hokkaido version which are totally different from the contents of the main site A, but information such as tools, know-how and appropriate user interface for constructing these contents is given from the main site A, so that the site B can be considered as a kind of partner site.

Besides these, it is also possible to provide the original contents (Hokkaido regional products sales corner, for example) if necessary. The number of accesses for these original contents can be used in evaluating the partnership handling fee, similarly as in the previous example.

Now, the various merits of the main site and the partner site in the scheme described above can be summarized as follows.

(1) Merits of the Main Site

By extending service to many directions or fields using the own contents as the tie-up contents, it is possible to expect the expansion of the sales. In particular, this effect can be enhanced by forming a partnership with the site having popular hit contents.

The income of the partnership handling fees from the partner sites can be obtained.

The survey of things such as the regional sales characteristics of new products, for example, can be realized by forming a partnership with local regional sites.

(2) Merits of the Partner Site

It becomes possible to start and operate the EC site in short time, regardless of the amount of original contents owned by the partner site itself.

The main site can be relied for carrying out tasks of updating the contents. Besides that, it is also possible to realize the outsourcing of services such as contents management, etc.

By the centralized control of the user information at the main site side, the extra database management can be eliminated so that a low cost site operation becomes possible. In addition, the main site can also be relied for carrying out the end-user marketing based on the user information.

It is possible to take advantage of the widely recognized brand image of the large scale main site side.

As described, according to the present invention, the site operation and management at the partner site side can be made easier by updating the tie-up pages of the partner site side remotely from the main site side. Also, the main site side can support the other management with respect to the partner site side as well. Also, by inheriting the contents of the main site side as the tie-up pages at the partner site side, the main site can extend the service to many sites. Also, the partnership handling fee can be set up flexibly according to the level of supports to be provided from the main site side to the partner site side and the contribution or the like of the partner site side with respect to the main site side.

For example, in the case of newly starting the EC site No. 2 for which the EC site No. 1 plays a role of a main site (or a master site), the contents of the site No. 2 are classified into the tie-up pages and the original pages. The tie-up pages are pages of the partnership with the master site No. 1, so that the tie-up pages are regularly updated by the manager of the site No. 1 by using a prescribed security mechanism. The page layout (such as this month's recommendation, etc.) can also be determined at the site No. 1 side.

When the user purchases goods at the site No. 2, the site No. 1 can carry out the centralized management of the authentication information including the membership information/password entered by the user. In this case, it is also possible for the site No. 2 side to maintain the copy. The information such as user logs can also be managed in the similar way. The log information such as the number of user accesses to the site No. 2 and the number of purchases can be shared between the site No. 1 and the site No. 2 under the guarantee provided by appropriate security mechanism. This information can also be utilized in evaluating the partnership handling fee between the site No. 1 and the site No. 2 according to the conditions that are defined separately.

According to the present invention, it is possible to update contents automatically among one master EC site and a plurality of partner EC sites in accordance with the master. Also, by transferring the user information safely to the master site, it is possible to carry out the end-user marketing using the individual authentication information such as the user ID and the password registered at the other sites. On the other hand, it is possible to count the number of visiting users of the partner site, calculate a level of contribution with respect to the business, and reflect it into the partnership handling fee. In this way, it is possible to provide some merits to both the master site and the partner sites.

As a result, even a small scale operator can increase the profit of the EC site in short time by utilizing the brand of a large scale operator, and reduce the resources for the site management, the end-user marketing, etc., so that it becomes possible to reduce the operation cost. Also, a large scale operator of the master EC site can realize the extension of the service to many sites in short time, so that it becomes possible to carry out the site operation that can take advantage of the scale merit.

It is to be noted that, in the above, the exemplary case of the the electronic shop service on the Internet has been described, but the present invention is also applicable to networks other than the Internet, as well as to services other than the electronic shop service, such as a system handling the network services such as information providing, etc., for example.

It is to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the main site server and the partner site server of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. An electronic service system comprising:
a first server system configured to provide electronic services as a main site on an Internet for client systems of a plurality of electronic service users; and
a plurality of second server systems configured to provide the electronic services as a partner site of the main site, each second server system being related to a specific operator that makes a partnership contract with an operator of the first server system,
the first server system including:
a first server communication interface unit configured to communicate via the Internet with each second server system or each client system that gains access to the first server system;
a main site page holding unit configured to hold a main site page for providing an electronic service related to a main site content for each client system that gains access to the main site;
a first server authentication processing unit configured to carry out authentication with each second server system; and
an updating unit configured to, when any content of the main site page is updated, cause the first server authentication processing unit to carry out the authentication and then transmit an updated inherited page having a same content as the updated main site page to each second server system in order to carry out a remote updating of an inherited page of each second server system having a same content as the main site page such that an inherited page before updating is overwrote with the updated inherited page or a link for the inherited page before updating is replaced with a link for the updated inherited page in the second server system, each second server system including:
a second server communication interface unit configured to communicate via the Internet with the first server system or each client system that gains access to the second server system;
a second server authentication processing unit configured to carry out authentication with the first server system for the remote updating of the inherited page by the first server system;
an inherited page holding unit configured to hold the inherited page for providing an electronic service related to an inherited content for each client system that gains access to the inherited content of the partner site, the inherited page being updated by the first server system;
an original page holding unit configured to hold an original page of the partner site for providing an electronic service related to an original content for each client system that gains access to the original content of the partner site;
a second server recording unit configured to record a first access log information indicating a log of access from each client system to the inherited page and a second access log information indicating a log of access from each client system to the original page; and
a transmitting unit configured to transmit the first access log information and the second access log information to the first server system,
the first server system further including:
a receiving unit configured to receive the first access log information and the second access log information from each second server system; and
a first sever recording unit configured to record the first access log information and the second access log information for each second sever system.

2. The electronic service system of claim 1, wherein the first server system transmits a content confirmation message for urging a site manager of each second server system to carry out a content confirmation before carrying out the remote updating;
each second server system presents a message for urging the site manager to carry out the content confirmation upon receiving the content confirmation message, and returns an affirmative message indicating an affirmation by the site manager when an input indicating the affirmation is entered from the site manager; and
the updating unit of the first server system carries out the remote updating upon receiving the affirmative message.

3. The electronic service system of claim 1, wherein when a predetermined information among the first access log information and the second access log information is used as a basis of calculation of a partnership handling fee to be charged from an operator of the first server system to an operator of each second server system, each second server system further includes a generating unit configured to generate a certificate for certifying that at least information as the basis of calculation of the partnership handling fee among the first access log information and the second access log information is not altered and attach the certificate to the at least information as the basis of calculation of the partnership handling fee, and the first server system further includes a verifying unit configured to verify that information which the certificate certifies has not been altered according to the certificate.

4. The electronic service system of claim 1, wherein each second server system further includes a notifying unit configured to receive a request made with respect to the inherited page from each client system and notify the request immediately to the first server system, and the first server system further includes a processing unit configured to process the request notified from each second server system.

5. The electronic service system of claim 1, wherein each second server system further includes a second server notifying unit configured to receive a request made with respect to the inherited page from each client system and notify the request immediately to the first server system, the first server system further includes a first server notifying unit configured to notify a command with respect to the request notified from the second server system, to the second server system, and each second server system further includes a processing unit configured to process the command notified from the first server system.

6. An electronic service system comprising:
a first server system configured to provide electronic services as a main site on an Internet for client systems of a plurality of electronic service users; and
a plurality of second server systems configured to provide the electronic services as a partner site of the main site, each second server system being related to a specific operator that makes a partnership contract with an operator of the first server system,
the first server system including:
a first server communication interface unit configured to communicate via the Internet with each second server system or each client system that gains access to the first server system;
a main site page holding unit configured to hold a main site page for providing an electronic service related to a main site content for each client system that gains access to the main site;
a first server authentication processing unit configured to carry out authentication with each second server system; and
an updating unit configured to, when any layout information of the main site page is updated, cause the first server authentication processing unit to carry out the authentication and then transmit an updated layout information of the main site page to each second server system in order to carry out a remote updating of an inherited page of each second server system having the same layout information as the updated layout information of the main site page such that a layout information of the inherited page before updating is overwrote with the updated layout information or a link for the layout information before updating is replaced with a link for the updated layout information in the second server system, each second server system including:
a second server communication interface unit configured to communicate via the Internet with the first server system or each client system that gains access to the second server system;
a second server authentication processing unit configured to carry out authentication with the first server system for the remote updating of the inherited page by the first server system;
an inherited page holding unit configured to hold the inherited page for providing an electronic service related to an inherited content for each client system that gains access to the inherited content of the partner site, the inherited page being updated by the first server system;
an original page holding unit configured to hold an original page of the partner site for providing an electronic service related to an original content for each client system that gains access to the original content of the partner site;
a second server recording unit configured to record a first access log information indicating a log of access from each client system to the inherited page and a second access log information indicating a log of access from each client system to the original page; and
a transmitting unit configured to transmit the first access log information and the second access log information to the first server system, the first server system further including:
a receiving unit configured to receive the first access log information and the second access log information from each second server system; and
a first sever recording unit configured to record the first access log information and the second access log information for each second sever system.

7. The electronic service system of claim 6, wherein the first server system transmits a content confirmation message for urging a site manager of each second server system to carry out a content confirmation before carrying out the remote updating;
each second server system presents a message for urging the site manager to carry out the content confirmation upon receiving the content confirmation message, and returns an affirmative message indicating an affirmation by the site manager when an input indicating the affirmation is entered from the site manager; and
the updating unit of the first server system carries out the remote updating upon receiving the affirmative message.

8. The electronic service system of claim 6, wherein when a predetermined information among the first access log information and the second access log information is used as a basis of calculation of a partnership handling fee to be charged from an operator of the first server system to an operator of each second server system, each second server system further includes a generating unit configured to generate a certificate for certifying that at least information as the basis of calculation of the partnership handling fee among the first access log information and the second access log information is not altered and attach the certificate to the at least information as the basis of calculation of the partnership handling fee, and the first server system further includes a verifying unit configured to verify that information which the certificate certifies has not been altered according to the certificate.

9. The electronic service system of claim 6, wherein each second server system further includes a notifying unit configured to receive a request made with respect to the inherited page from each client system and notify the request immediately to the first server system, and the first server system further includes a processing unit configured to process the request notified from each second server system.

10. The electronic service system of claim 6, wherein each second server system further includes a second server notifying unit configured to receive a request made with respect to the inherited page from each client system and notify the request immediately to the first server system, the first server system further includes a first server notifying unit configured to notify a command with respect to the request notified from the second server system, to the second server system, and each second server system further includes a processing unit configured to process the command notified from the first server system.

* * * * *